(12) United States Patent
Kim et al.

(10) Patent No.: US 11,624,166 B2
(45) Date of Patent: *Apr. 11, 2023

(54) TOOTHED DRUM TYPE OIL RECOVERY DEVICE

(71) Applicant: KOREA INSTITUTE OF SCIENCE AND TECHNOLOGY, Seoul (KR)

(72) Inventors: Seong-Jin Kim, Seoul (KR); Myoung-Woon Moon, Seoul (KR); Seo-Hyun Cho, Seoul (KR); Young-A Lee, Seoul (KR); Chang-Hwi Sim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,885

(22) Filed: Jul. 1, 2021

(65) Prior Publication Data

US 2022/0251793 A1     Aug. 11, 2022

(30) Foreign Application Priority Data

Feb. 8, 2021    (KR) ......................... 10-2021-0017338

(51) Int. Cl.
*E02B 15/10*     (2006.01)
*C02F 1/40*      (2023.01)
(Continued)

(52) U.S. Cl.
CPC ........ *E02B 15/103* (2013.01); *B01D 17/0214* (2013.01); *B01D 17/045* (2013.01);
(Continued)

(58) Field of Classification Search
CPC .... E02B 15/048; E02B 15/102; E02B 15/103; E02B 15/104; B01D 17/0214; C02F 1/40
(Continued)

(56) References Cited

U.S. PATENT DOCUMENTS 3,338,414 A * 8/1967 Lefke ................... E02B 15/102
                                                      210/776
3,426,902 A * 2/1969 Kilpert .................. E02B 15/103
                                                      210/776
(Continued)

FOREIGN PATENT DOCUMENTS

JP          09508453 A     8/1997
KR       10-0711296 B1     4/2007
(Continued)

*Primary Examiner* — Christopher Upton
(74) *Attorney, Agent, or Firm* — Cantor Colburn LLP (57) ABSTRACT

Provided is a toothed drum type oil recovery device, which includes: a recovery drum having a center coupled to a rotary shaft and having a plurality of tooth units formed around an outer circumference thereof, wherein one side of the recovery drum is disposed in the water to which oil is spilled so that the oil is recovered by the tooth unit at one side of the recovery drum according to the rotation; and a separation unit containing an oil separating liquid and disposed at the other side of the recovery drum, wherein when the tooth unit moves onto the oil separating liquid at the other side of the recovery drum according to the rotation of the recovery drum, the oil separating liquid is introduced into a space between the tooth units adjacent to each other by means of a capillary action to separate the oil from the tooth unit.

6 Claims, 8 Drawing Sheets

(51) Int. Cl.
 *E02B 15/04* (2006.01)
 *B01D 17/04* (2006.01)
 *B01D 17/02* (2006.01)
 *C02F 103/00* (2006.01)
 *C02F 101/32* (2006.01)

(52) U.S. Cl.
 CPC .............. *C02F 1/40* (2013.01); *E02B 15/048* (2013.01); *C02F 2101/32* (2013.01); *C02F 2103/007* (2013.01)

(58) Field of Classification Search
 USPC ... 210/170.05, 170.09, 170.1, 170.11, 242.3, 210/242.4, 747.5, 747.6, 776, 923, 924
 See application file for complete search history.

(56) References Cited

U.S. PATENT DOCUMENTS

| | | | | |
|---|---|---|---|---|
| 3,623,609 A | * | 11/1971 | Ainlay | E02B 15/104 210/242.3 |
| 4,315,818 A | * | 2/1982 | Thomas | E02B 15/103 210/242.3 |
| 4,336,137 A | * | 6/1982 | Byers | E02B 15/104 210/242.3 |
| 5,019,253 A | * | 5/1991 | Byers | B02C 4/30 210/923 |
| 5,380,431 A | * | 1/1995 | Newsom | E02B 15/103 210/242.3 |
| 5,387,341 A | * | 2/1995 | Remy | E02B 15/102 210/242.3 |
| 7,410,577 B2 | * | 8/2008 | Broje | E02B 15/103 210/242.3 |

FOREIGN PATENT DOCUMENTS

| | | |
|---|---|---|
| KR | 101547961 B1 | 8/2015 |
| KR | 1020160056679 A | 5/2016 |
| KR | 1020210069897 A | 6/2021 |

* cited by examiner

TOOTHED DRUM TYPE OIL RECOVERY DEVICE

CROSS-REFERENCE TO RELATED APPLICATIONS

This application claims priority under 35 U.S.C. § 119 to Korean Patent Application No. 10-2021-0017338, filed on Feb. 8, 2021, in the Korean Intellectual Property Office, the disclosure of which is incorporated herein by reference in its entirety.

TECHNICAL FIELD

The following disclosure relates to an oil recovery device that recovers oil spilled into the water, and more particularly, to a toothed drum type oil recovery device that recovers oil spilled into the water by a recovery drum having a tooth unit formed around an outer circumference thereof.

BACKGROUND

Recently, oil spill accidents are occurring frequently in the ocean or river due to various causes. If oil spill accidents occur in the ocean or river, oil or hazardous noxious substances (HNS) on the surface of the sea water or river water spreads rapidly area to cause serious environmental pollution.

Therefore, in order to prevent such water pollution, it is most important to prevent accidents of various transportation means such as ships operating in the sea or river, and if an oil or HNS spill accident occurs, it is important to promptly remove the spilled oil or HNS.

Meanwhile, when oil is spilled, there is used a method of spraying an emulsifier on the surface of water on which oil is floating in order to sink the oil to the bottom of the sea or river, or a method of removing the oil from the shore using an adsorption bag after the pollutants spread to the shore.

However, emulsifiers have a problem of causing secondary pollution by sinking oil on the bottom of the sea or river, and oil removal by the adsorption bag may be used only after pollutants has already propagated seriously. Therefore, there is a need to develop a technology to effectively block and recover oil just after oil is spilled.

In order to recover oil, an oil skimmer is sometimes used, but since more water is recovered during recovery, it is reported that more water than oil is stored in the recovered oil storage, resulting in low oil recovery efficiency.

Meanwhile, in addition to the above methods, there is an oil-water separation method in which the spilled oil is separated from water by controlling the surface energy such as hydrophilicity and hydrophobicity of the surface.

The oil-water separation method may be classified into a method that uses a superhydrophobic filter with low surface energy to pass oil and block water, and a method that uses a hydrophilic or superhydrophilic filter with high surface energy to pass water but block oil by means of a water film formed between the filters.

As mentioned above, conventional oil skimmers including adsorbents, emulsifiers and lipophilic materials to remove oil spilled into the ocean or river do not have excellent oil recovery performance, so there is a need to develop a device including a hydrophilic material to separate water and oil.

RELATED LITERATURES

Patent Literature

Korean Patent Registration No. 10-0711296 (registered on Apr. 25, 2007)

SUMMARY

The present disclosure is designed from the above background, and the present disclosure is directed to providing a toothed drum type oil recovery device, which may continuously recover oil spilled into the water by separating the oil recovered by a tooth unit at one side of a recovery drum from the tooth unit by a capillary action at the other side of the recovery drum, so that no oil residue remains on the surface of the recovery drum.

In addition, the present disclosure is directed to providing a toothed drum type oil recovery device, which may prevent the oil not separated from the recovery drum but remaining on the recovery drum from spilling back into the water since the oil recovered by the tooth unit is entirely separated from the tooth unit by the capillary action.

The object of the present disclosure is not limited thereto, and other objects not mentioned herein will be clearly understood by those skilled in the art from the following description.

In one general aspect of the present disclosure, there is provided a toothed drum type oil recovery device, comprising: a recovery drum having a center coupled to a rotary shaft to rotate together with the rotary shaft and having a plurality of tooth units formed around an outer circumference thereof, wherein one side of the recovery drum is disposed in the water to which oil is spilled so that the oil is recovered by the tooth unit at one side of the recovery drum according to the rotation; and a separation unit containing an oil separating liquid and disposed at the other side of the recovery drum, wherein when the tooth unit moves onto the oil separating liquid at the other side of the recovery drum according to the rotation of the recovery drum, the oil separating liquid is introduced into a space between the tooth units adjacent to each other by means of a capillary action to separate the oil from the tooth unit.

In addition, the tooth unit may be made of a hydrophilic material, and the oil separating liquid may be water.

In addition, the tooth unit may be made of a porous material that absorbs water therein.

In addition, the tooth unit may be formed so that a front inclination angle of a front tooth surface thereof and a rear inclination angle of a rear tooth surface thereof are different from each other.

In addition, the tooth unit may be formed to have a height of 1 mm to 6 mm and a width of 1 mm to 6 mm.

In addition, a nanostructure having at least one shape selected from the group consisting of nano-hair, nano-fiber, nano-pillar, nano-rod and nano-wire shapes may be formed on the surface of the tooth unit.

According to an embodiment of the present disclosure, since the oil recovered by a tooth unit at one side of a recovery drum is separated from the tooth unit by a capillary action at the other side of the recovery drum, no oil residue remains on the surface of the recovery drum, so it is possible to continuously recover oil spilled into the water by separating.

In addition, since the oil recovered by the tooth unit is entirely separated from the tooth unit by the capillary action,

DETAILED DESCRIPTION OF EMBODIMENTS

Hereinafter, some embodiments of the present disclosure will be described in detail with reference to the exemplary drawings. In adding reference numerals to elements of each drawing, it should be noted that the same elements have the same reference numerals as possible even if they are indicated on different drawings. In addition, in the present disclosure, if it is determined that a detailed description of a related known configuration or function may obscure the subject matter of the present disclosure, the detailed description thereof will be omitted.

In addition, in describing a component of the present disclosure, terms such as first, second, A, B, (a), and (b) may be used. These terms are only for distinguishing the component from other components, and the nature, order or sequence of the component is not limited by the term. When a component is described as being "connected", "coupled" or "accessed" to another component, the component may be directly connected or accessed to another component, but it will be understood that still another component may be further "connected", "coupled" or "accessed" between these components.

As shown in the drawings, a toothed drum type oil recovery device according to an embodiment of the present disclosure includes: a recovery drum 100 having a center coupled to a rotary shaft 10 to rotate together with the rotary shaft 10 and having a plurality of tooth units 130 formed around an outer circumference thereof, wherein one side of the recovery drum 100 is disposed in the water to which oil O is spilled so that the oil O is recovered by the tooth unit 130 at one side of the recovery drum 100 according to the rotation; and a separation unit 200 containing an oil separating liquid L and disposed at the other side of the recovery drum 100, wherein when the tooth unit 130 moves onto the oil separating liquid L at the other side of the recovery drum 100 according to the rotation of the recovery drum 100, the oil separating liquid L is introduced into a space between the tooth units 130 adjacent to each other by means of a capillary action to separate the oil O from the tooth unit 130.

Hereinafter, each component of the present disclosure will be described in detail with reference to FIGS. 1 to 8.

Figure 1:
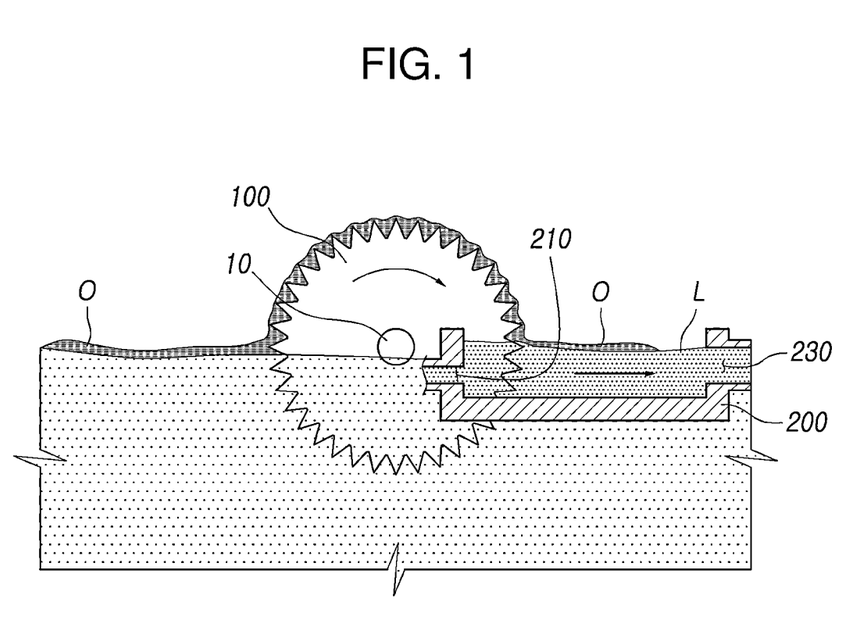
FIG. 1 is a diagram showing an overall configuration of a toothed drum type oil recovery device according to an embodiment of the present disclosure.

First, as shown in FIG. 1, the center of the recovery drum 100 is coupled to the rotary shaft 10 so that the recovery drum 100 rotates together with the rotary shaft 10, and a plurality of tooth units 130 are formed along the outer circumference of the recovery drum 100 so that one side of the plurality of tooth units 130 is disposed in the water to which oil O is spilled to recover the oil O by the tooth units 130 at one side of the recovery drum 100 according to the rotation.

Figure 2:
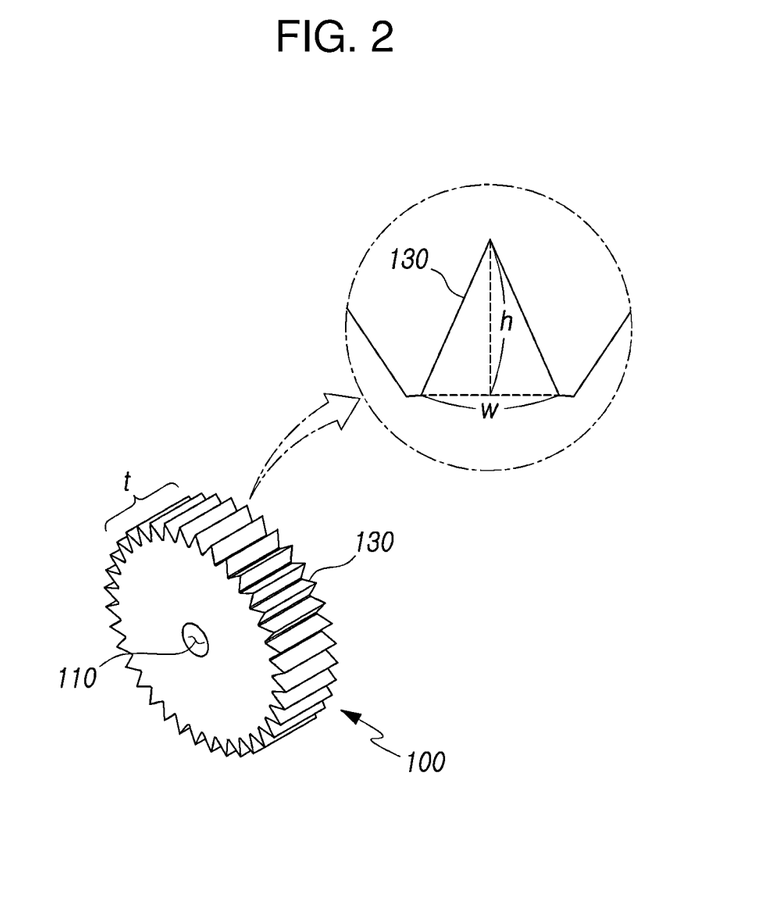
FIG. 2 is a diagram showing a recovery drum according to an embodiment of the present disclosure.

As shown in FIG. 2, the recovery drum 100 may be formed in an approximately cylindrical shape, and at this time, the recovery drum 100 may have various radiuses of various centimeters to several meters.

A shaft coupling hole 110 is formed through the center of the recovery drum 100, and the recovery drum 100 is coupled with the rotary shaft 10 by inserting the rotary shaft 10 through the shaft coupling hole 110.

Meanwhile, the rotary shaft 10 is mounted at a front portion of a ship that recovers oil O spilled into the water and coupled to a driving means (not shown) provided outside so as to rotate by a braking power provided by the driving means.

In this case, the driving means may be provided as a power device capable of providing power to the rotary shaft 10, and as an example, the driving means may be provided as an electric motor or the like.

That is, the oil recovery device according to the present disclosure may be mounted at the front portion of a ship that recovers oil and configured to recover the oil O spilled into the water.

Meanwhile, the recovery drum 100 according to the present disclosure is characterized in that a plurality of tooth units 130 are formed along the outer circumference thereof to recover the oil O spilled into the water by the tooth unit 130 according to the rotation.

More specifically, as shown in FIG. 1, one side of the recovery drum 100 is disposed in the water to which oil O is spilled, and is provided to recover the oil O by the tooth unit 130 at one side thereof according to the rotation.

According to the present disclosure, one side of the recovery drum 100 is placed in the water to which oil O is spilled. Here, when the recovery drum 100 rotates from one side to the other, the oil O spilled into the water is recovered as the oil O is introduced into a space between the tooth units 130 adjacent to each other or the oil O is attached to an end of the tooth units 130.

At this time, the oil O recovered by the tooth unit 130 moves from one side of the recovery drum 100 to the other side thereof according to the rotation of the recovery drum 100.

The oil O moved to the other side of the recovery drum 100 is separated from the tooth unit 130 by the separation unit 200 provided at the other side of the recovery drum 100 and finally recovered, as will be described in detail later.

Subsequently, the separation unit 200 contains the oil separating liquid L and is disposed at the other side of the recovery drum 100. Here, when the tooth unit 130 moves onto the oil separating liquid L at the other side of the recovery drum 100 according to the rotation of the recovery drum 100, the oil separating liquid L is introduced into the space between the tooth units 130 adjacent to each other by a capillary action to separate the oil O from the tooth unit 130.

As shown in FIG. 1, the separation unit 200 according to the present disclosure is disposed at the other side of the recovery drum 100 and is provided to separate the oil O moving from one side of the recovery drum 100 to the other side thereof from the recovery drum 100 according to the rotation of the recovery drum 100.

As the recovery drum 100 rotates, at the other side of the recovery drum 100, the tooth unit 130 moves into the oil separating liquid L provided in the separation unit 200. At this time, the oil O recovered by the tooth unit 130 is separated from the tooth unit 130 by the oil separating liquid L.

In more detail, when the tooth unit 130 moves onto the oil separating liquid L at the other side of the recovery drum 100 according to the rotation of the recovery drum 100, the oil O recovered by the tooth unit 130 is separated from the tooth unit 130 as the oil separating liquid L is introduced into the space between tooth units 130 adjacent to each other due to the capillary action.

The process of separating the oil O as above will be described with reference to FIG. 5. If the tooth unit 130 moves into the oil separating liquid L provided in the separation unit 200 according to the rotation of the recovery drum 100 (FIG. 5 (a)), the oil separating liquid L is rapidly introduced into the space between the tooth units 130 adjacent to each other due to the capillary action to push the recovered oil O recovered into the space between the tooth units 130 (FIG. 5(b)), and as the oil separating liquid L is continuously introduced into the space between the tooth units 130, the oil O is finally separated from the tooth units 130 (FIG. 5 (c)).

Figure 6:
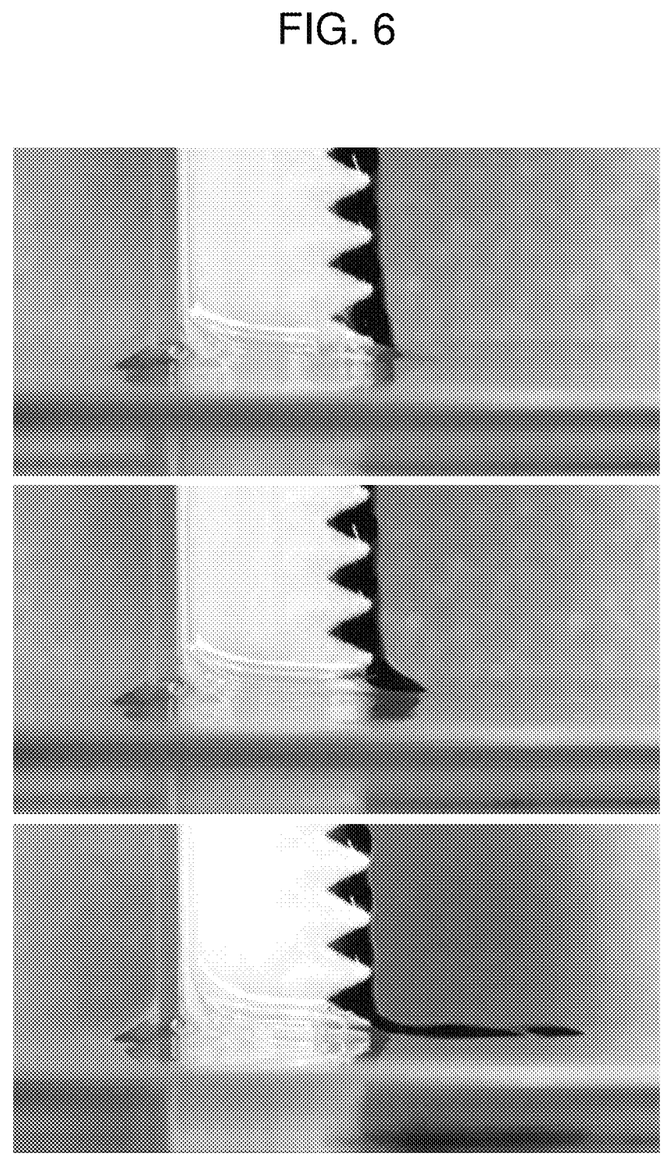
FIG. 6 is a photograph showing that oil is separated from the tooth unit according to an embodiment of the present disclosure.

Meanwhile, FIG. 6 shows that the oil O is separated from the tooth units 130 by a capillary action as the tooth units 130 actually move into the oil separating liquid L.

Figure 7:
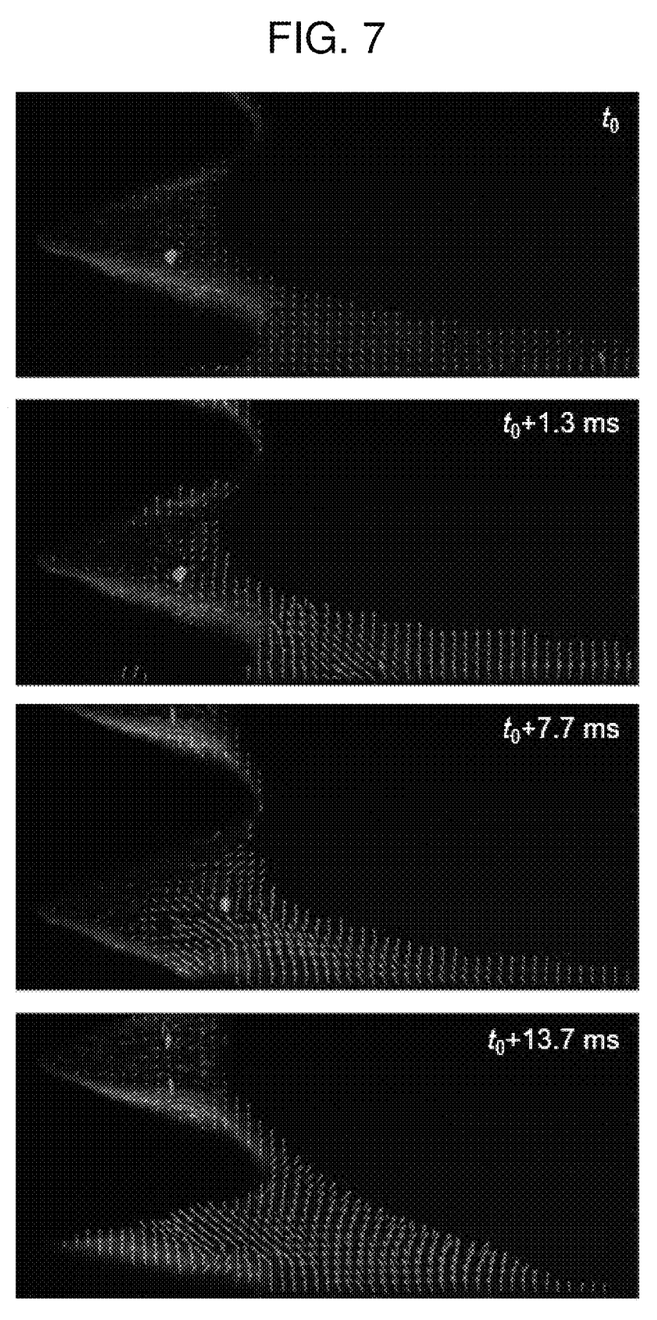
FIG. 7 is a photograph showing a relative velocity vector field of an oil separating liquid with respect to the tooth unit, when the tooth unit according to an embodiment of the present disclosure moves into the oil separating liquid.

In addition, FIG. 7 shows a relative velocity vector field of the oil separating liquid L with respect to the tooth unit 130 when the tooth unit 130 moves into the oil separating liquid L. As shown in FIG. 7, it may be found that the oil O is separated from the tooth units 130 as the oil separating liquid L is introduced into the space between tooth units 130 adjacent to each other.

Meanwhile, as shown in FIG. 1, the separation unit 200 according to the present disclosure is disposed at the other side of the recovery drum 100 and may be provided in the form of a water tank as an example so as to contain the oil separating liquid L.

At this time, a liquid input hole 210 through which the oil separating liquid L is introduced may be formed at one side of the separation unit 200, and a liquid output hole 230 through which the oil separating liquid L is discharged may be formed at the other side of the separation unit 200.

The separation unit 200 may introduce the oil separating liquid L through the liquid input hole 210 at one side by means of a pump (not shown) provided at the outside and discharge the oil separating liquid L through liquid output hole 230 at the other side, so that the oil separating liquid L may circulate inside the separation unit 200.

By doing so, the oil O separated from the tooth unit 130 may be discharged through the liquid output hole 230 along with the oil separating liquid L that circulates inside the separation unit 200, and the oil discharged through the liquid output hole 230 may be stored in an oil recovery tank (not shown) that is provided adjacent to the separation unit 200.

As described above, the oil recovery device according to the present disclosure is characterized in that a plurality of tooth units 130 are formed along the outer circumference of the recovery drum 100 so that the oil O spilled into the water is recovered by the tooth unit 130 at one side thereof, and the oil O is separated from the tooth unit 130 by the separation unit 200 at the other side thereof so that the oil O is discharged through the liquid output hole 230 of the separation unit 200.

Figure 8:
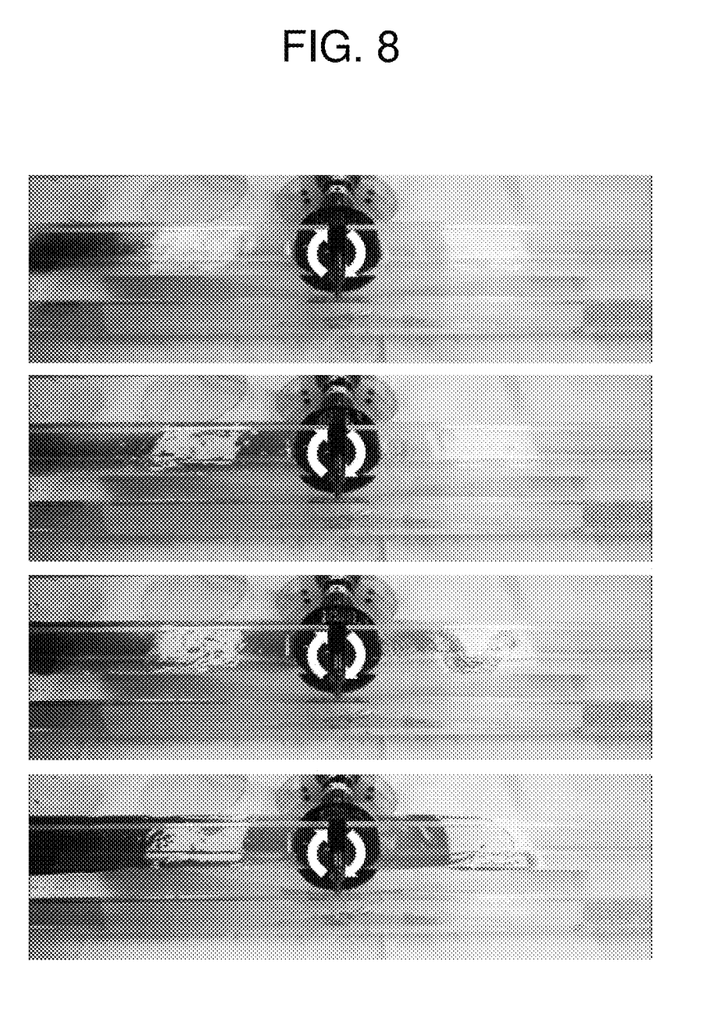
FIG. 8 is a photograph showing that the toothed drum type oil recovery device according to an embodiment of the present disclosure recovers the oil spilled into the water.

FIG. 8 shows an actual operation of the oil recovery device according to the present disclosure. As shown in FIG. 8, the oil O spilled into the water is recovered at one side of the recovery drum 100, is moved from one side of the recovery drum 100 to the other side thereof according to the rotation of the recovery drum 100, and then is separated at the other side of the recovery drum 100 to be finally recovered.

That is, in the oil recovery device according to the present disclosure, the oil O is recovered at one side of the recovery drum 100 and the oil O is separated at the other side of the recovery drum 100. At this time, the tooth unit 130 formed along the outer circumference of the recovery drum 100 may be configured to have various materials, shapes and sizes in order to improve the performance of the oil recovery function at one side of the recovery drum 100 and the oil separation function at the other side of the recovery drum 100.

Hereinafter, various embodiments of the tooth unit 130 for improving the performance of the oil recovery function and the oil separation function of the oil recovery device will be described.

First, the tooth unit 130 may be made of a hydrophilic material, and at this time, the oil separating liquid L described above may be provided as water.

Since the tooth unit 130 is made of hydrophilic material and the oil separating liquid L is provided as water, the capillary action that occurs between the tooth unit 130 and the oil separating liquid L may be maximized, and accordingly the oil O may be separated more easily from the tooth unit 130.

In addition, if the tooth unit 130 is made of a hydrophilic material, the oil O recovered by the tooth unit 130 by moisture is prevented from directly contact and being attached to the surface of the tooth unit 130, so the oil O may be more easily separated from the tooth unit 130.

Meanwhile, the tooth unit 130 may be made of a porous material that absorbs moisture. Since the tooth unit 130 is made of a porous material that absorbs moisture, the surface of the tooth unit 130 is kept wet by moisture.

More specifically, the tooth unit 130 may be made of a porous material forming micro pores, and the size of the pores may be 10 μm to 100 μm.

If the surface of the tooth unit 130 is wet with moisture, the phenomenon that the oil O recovered by the tooth unit 130 directly contacts the surface of the tooth unit 130 and is attached thereto may be prevented by the moisture, and thus the oil O may be separated from the tooth unit 130 more easily.

Meanwhile, the tooth unit 130 according to an embodiment of the present disclosure may have a nano structure formed on the surface thereof in order to improve hydrophilicity.

Here, the nano structure may have at least one shape selected from the group consisting of nano-hair, nano-fiber, nano-pillar, nano-rod and nano-wire shapes.

In addition, the nano structure may have a height of 1 μm or more and a width of 2 μm or less, and the interval between nano structures may be 2 μm or less.

Figure 5:
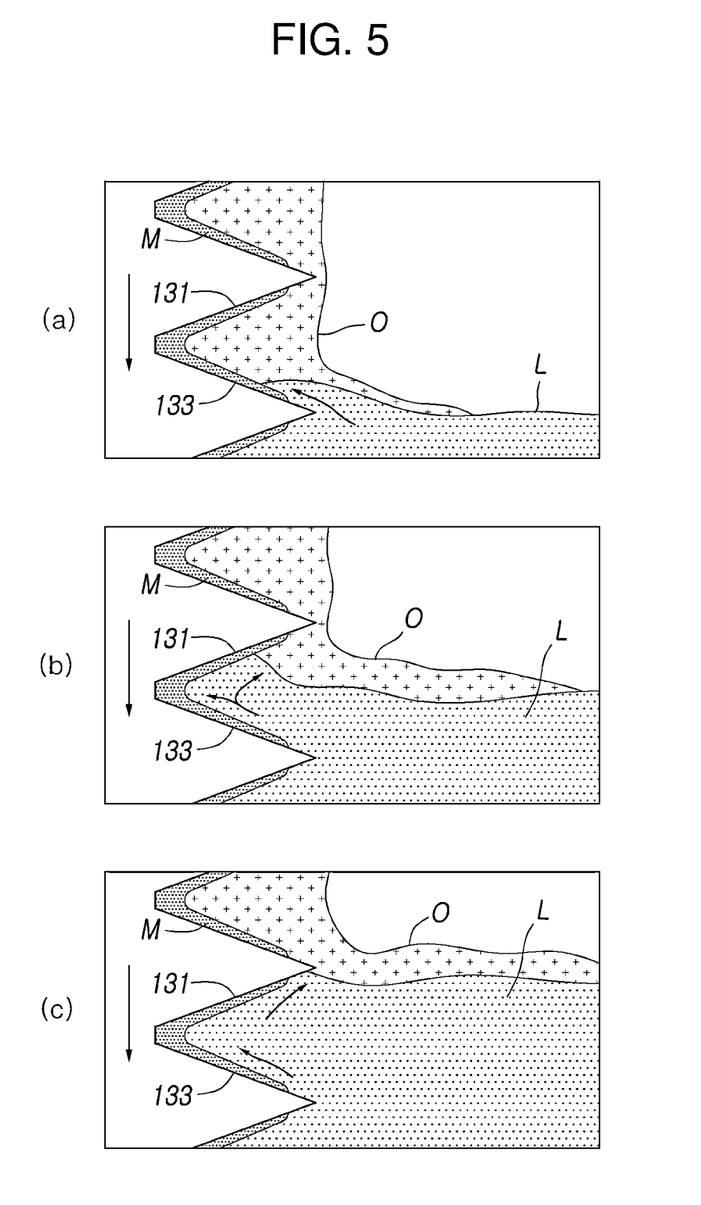
FIG. 5 is a diagram for illustrating a process of separating oil from the tooth unit according to an embodiment of the present disclosure.

If the nano structure is formed on the surface of the tooth unit 130, as shown in FIG. 5, the hydrophilicity of the tooth unit 130 is improved to form a water film M on the surface of the tooth unit 130. Accordingly, the contact surface of the tooth unit 130 and the oil O may be minimized, and eventually the oil O may be more easily separated from the tooth unit 130.

Figure 3:
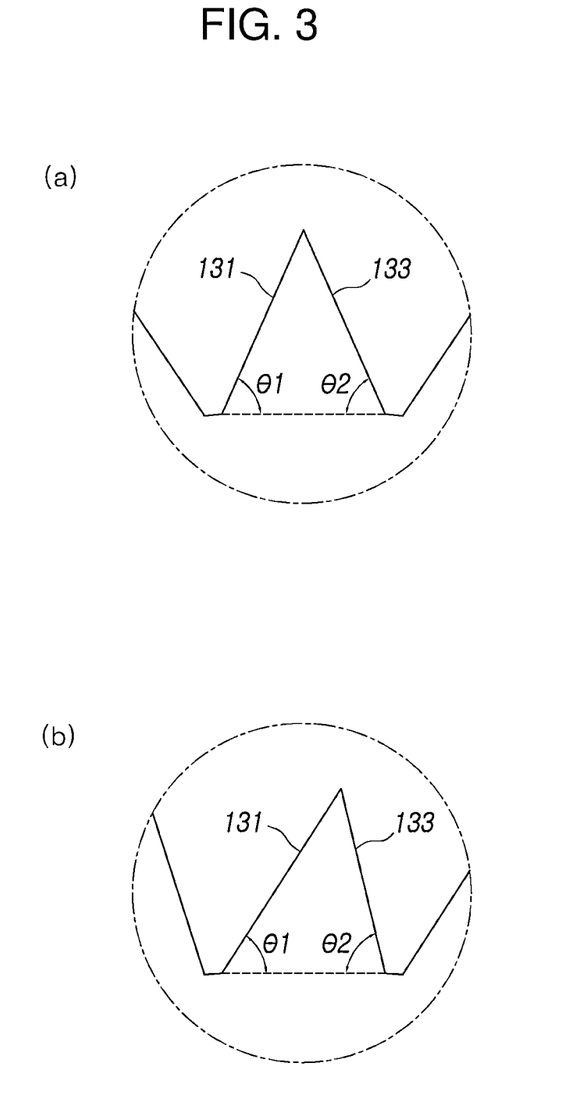
FIG. 3 is an enlarged view showing a tooth unit according to an embodiment of the present disclosure.
Figure 4:
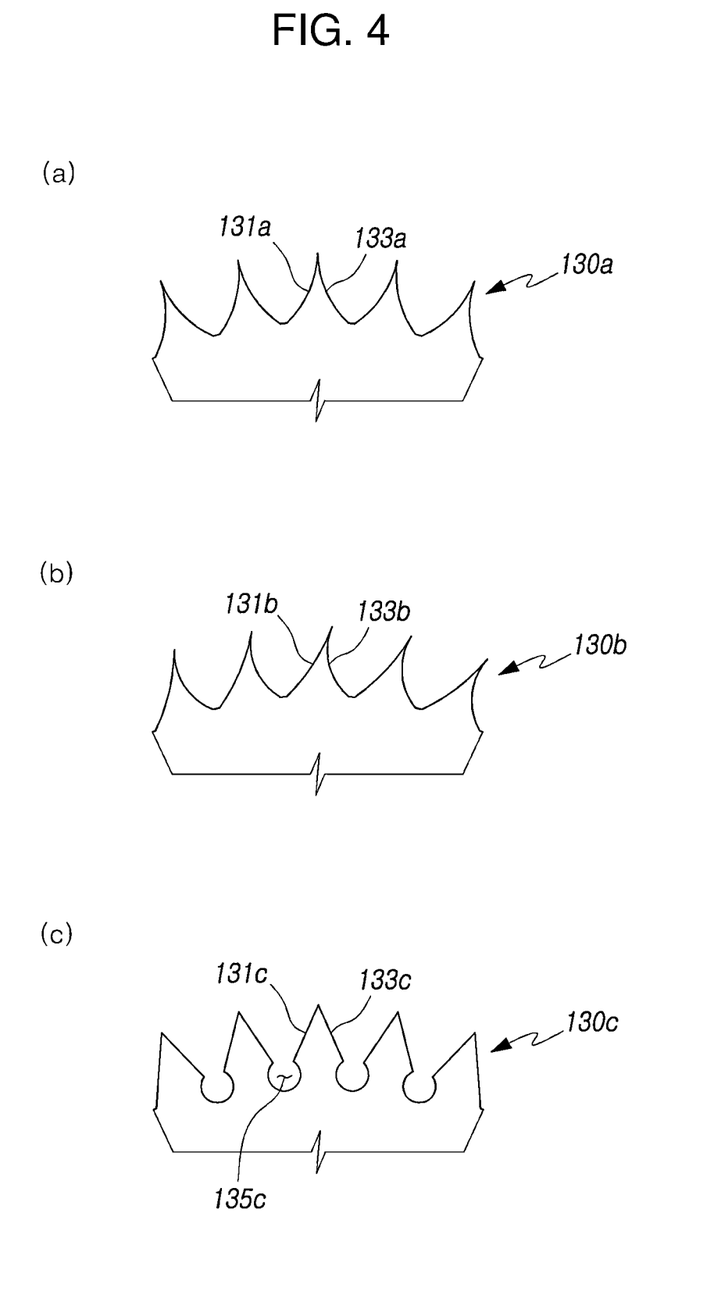
FIG. 4 is a diagram showing a tooth unit according to various embodiments of the present disclosure.

Subsequently, as shown in FIG. 3, the tooth unit 130 may be configured such that a front inclination angle (θ1) of a front tooth surface 131 thereof and a rear inclination angle (θ2) of a rear tooth surface 133 thereof are different from each other.

In the tooth unit 130 according to the present disclosure, the front inclination angle (θ1) of the front tooth surface 131 and the rear inclination angle (θ2) of the rear tooth surface 133 may be identical to each other as shown in FIG. 3(a) such that the front tooth surface 131 and the rear tooth surface 133 are formed symmetrically, or the front inclination angle (θ1) of the front tooth surface 131 and the rear inclination angle (θ2) of the rear tooth surface 133 may be formed differently as shown in FIG. 3(b) such that the front tooth surface 131 and the rear tooth surface 133 are formed asymmetrically.

In this case, the front inclination angle (θ1) of the front tooth surface 131 may be 45° to 75°, and the rear inclination angle (θ2) of the rear tooth surface 133 may be 45° to 75°.

For example, in tooth unit 130, both the front inclination angle (θ1) of the front tooth surface 131 and the rear inclination angle (θ2) of the rear tooth surface 133 may be formed as 45°, so that the front tooth surface 131 and the rear tooth surface 133 are formed symmetrical.

Here, if the front inclination angle (θ1) of the front tooth surface 131 and the rear inclination angle (θ2) of the rear tooth surface 133 are formed differently to form the front tooth surface 131 and the rear tooth surface 133 asymmetrically, it is possible to improve the performance of the oil recovery function and the oil separation function of the recovery drum 100.

For example, in tooth unit 130, the rear inclination angle (θ2) of the rear tooth surface 133 may be larger than the front inclination angle (θ1) of the front tooth surface 131, and in particular, the front inclination angle (θ1) of the front tooth surface 131 may be 45°, and the rear inclination angle (θ2) of the rear tooth surface 133 may be 75°.

In this case, since the rear inclination angle (θ2) of the rear tooth surface 133 is formed more steeply, the oil O may be recovered more easily by the tooth unit 130 at one side of the recovery drum 100.

As another example, in the tooth unit 130, the front inclination angle (θ1) of the front tooth surface 131 may be larger than the rear inclination angle (θ2) of the rear tooth surface 133, and in particular, the front inclination angle (θ1) of the front tooth surface 131 may be 75°, and the rear inclination angle (θ2) of the rear tooth surface 133 may be 45°.

In this case, the angle between the front tooth surface 131 and the surface of the oil separating liquid L is reduced at the other side of the recovery drum 100, so that the capillary action of the oil separating liquid L starting from the front tooth surface 131 may more easily occur.

By forming the front inclination angle (θ1) of the front tooth surface 131 and the rear inclination angle (θ2) of the rear tooth surface 133 identically or differently as above, it is possible to improve the performance of the oil recovery function and the oil separation function of the recovery drum 100.

Subsequently, as shown in FIG. 4(a), a tooth unit 130a according to another embodiment of the present disclosure may be configured such that at least one of the front tooth surface 131a and the rear tooth surface 133a is formed in a curved shape.

That is, as shown in FIG. 3, the tooth unit 130 may be configured such that both the front tooth surface 131 and the rear tooth surface 133 are formed in a planar shape, but they may also be formed in a curved shape as shown in FIG. 4(a).

As an example, as shown in FIG. 4(a), the tooth unit 130a may be configured such that both the front tooth surface 131a and the rear tooth surface 133a are formed in a curved shape curved toward the inside of the tooth unit 130a. However, without being limited thereto, in the tooth unit 130a, only one of the front tooth surface 131a and the rear tooth surface 133a may be formed in a curved shape.

If the tooth unit 130a of the present disclosure is made of a hydrophilic material as described above, the oil O recovered by the tooth unit 130a is mainly in contact with the surface of an end portion of the tooth unit 130a as shown in FIG. 5, and the oil O is not directly in contact with other portions of the tooth unit 130a than the end portion due to hydrophilicity.

Accordingly, by forming the front tooth surface 131a and the rear tooth surface 133a in a curved shape, it is possible to minimize the contact surface with the oil O at the end portion of the tooth unit 130a, and accordingly the oil O may be more easily separated from the tooth unit 130a.

Meanwhile, as shown in FIG. 4(b), in a tooth unit 130b according to still another embodiment of the present disclosure, both the front tooth surface 131b and the rear tooth surface 133b are formed in a curved shape curved toward the inside of the tooth unit 130b, but the radius of curvature of the front tooth surface 131b and the radius of curvature of the rear tooth surface 133b may be different.

More specifically, in the tooth unit 130b according to still another embodiment of the present disclosure, both the front tooth surface 131b and the rear tooth surface 133b may be formed in a curved shape curved toward the inside of the tooth unit 130b so that the radius of curvature of the front tooth surface 131b is larger than the radius of curvature of the rear tooth surface 133b.

If the radius of curvature of the front tooth surface 131b is larger than the radius of curvature of the rear tooth surface 133b as above, the oil O may be more easily recovered by the tooth unit 130b at one side of the recovery drum 100, and the capillary action of the oil separating liquid L may more easily occur at the other side of the recovery drum 100.

Since the inclination of the front tooth surface 131b becomes smaller at the other side of the recovery drum 100 as the radius of curvature of the front tooth surface 131b increases, the capillary action of the oil separating liquid L may occur more easily.

In addition, as the radius of curvature of the rear tooth surface 133b is smaller, the oil O does not easily flow down again from the rear tooth surface 133b when the oil O is recovered at one side of the recovery drum 100.

Subsequently, as shown in FIG. 4(c), a tooth unit 130c according to still another embodiment of the present disclosure may have a liquid containing groove 135c formed in a space between the tooth units 130c adjacent to each other.

A predetermined liquid may be introduced into the liquid containing groove 135c formed in the space between the tooth units 130c, and the contact surface between the tooth unit 130c and the oil O may be minimized by the liquid introduced into the liquid containing groove 135c. Accordingly, the oil O may be separated more easily from the tooth unit 130a.

Here, the liquid introduced into the liquid containing groove 135c may be water introduced from the water at one side of the recovery drum 100, or the oil separating liquid L introduced from the separation unit 200.

Subsequently, the tooth unit 130 according to an embodiment of the present disclosure is formed to have a height (h) of 1 mm to 6 mm and a width (w) of 1 mm to 6 mm.

Here, the height (h) and the width (w) of the tooth unit 130 may be expressed as shown in FIG. 2.

If the height (h) and width (w) of the tooth unit 130 are formed too large, the area where the capillary action occurs may be formed too locally compared to the size of the tooth unit 130, so that the oil O may be not smoothly separated from the tooth unit 130.

On the contrary, if the height (h) and the width (w) of the tooth unit 130 are too small, the capillary action does not occur easily, and thus the oil O is not easily separated.

Therefore, the tooth unit 130 according to an embodiment of the present disclosure may have a height (h) and a width (w) of 1 mm to 6 mm, respectively, in consideration of the capillary length (=2.7 mm) of water.

Here, the tooth unit 130 according to an embodiment of the present disclosure may be formed to have a thickness (t) of 3 mm or more. If the thickness (t) of the tooth unit 130 is less than 3 mm, due to another capillary phenomenon in a thickness direction of the tooth unit 130, the capillary action from the end portion of the tooth unit 130 to the bottom between the tooth units 130 may not be smoothly performed.

As described above, according to an embodiment of the present disclosure, since the oil recovered by the tooth unit at one side of the recovery drum is separated from the tooth unit by a capillary action at the other side of the recovery drum, oil residues do not remain on the surface of the recovery drum, and thus the work of recovering the oil spilled into the water may be continuously performed.

In addition, since the oil recovered by the tooth unit is entirely separated from the tooth unit by the capillary action, it is possible to prevent the oil not separated from the recovery drum but remaining on the recovery drum from spilling back into the water.

In the above, even though all components constituting the embodiment of the present disclosure have been described as being combined into one or operating in combination, the present disclosure is not necessarily limited to this embodiment. In other words, within the scope of the purpose of the present disclosure, one or more of all components may be selectively combined to operate.

The above explanation is merely illustrative of the technical idea of the present disclosure, and various changes and modifications can be made by those with ordinary knowledge in the technical field to which the present disclosure belongs, without departing from the essential characteristics of the present disclosure. Accordingly, the embodiments disclosed in the present disclosure are not intended to limit the technical idea of the present disclosure, but to describe, and the scope of the technical idea of the present disclosure is not limited by the embodiments. The scope of protection of the present disclosure should be interpreted by the scope of the appended claims, and all technical ideas within the equivalent scope should be construed as being included in the scope of the present disclosure.

REFERENCE NUMERALS

10: rotary shaft
100: recovery drum
110: shaft coupling hole
130: tooth unit
200: separation unit
210: liquid input hole
230: liquid output hole

What is claimed is:

1. A toothed drum type oil recovery device, comprising:
    a recovery drum having a center coupled to a rotary shaft to rotate together with the rotary shaft and having a plurality of tooth units formed around an outer circumference thereof, wherein one side of the recovery drum is disposed in the water to which oil is spilled so that the oil is recovered by the tooth unit at one side of the recovery drum according to the rotation; and
    a separation unit containing an oil separating liquid and disposed at a other side of the recovery drum, wherein when the tooth unit moves onto the oil separating liquid at the other side of the recovery drum according to the rotation of the recovery drum, the oil separating liquid is introduced into a space between the tooth units adjacent to each other by means of a capillary action to separate the oil from the tooth unit.

2. The toothed drum type oil recovery device according to claim 1,
    wherein the tooth unit is made of a hydrophilic material, and the oil separating liquid is water.

3. The toothed drum type oil recovery device according to claim 2,
    wherein the tooth unit is made of a porous material that absorbs water therein.

4. The toothed drum type oil recovery device according to claim 2,
    wherein a nanostructure having at least one shape selected from the group consisting of nano-hair, nano-fiber, nano-pillar, nano-rod and nano-wire shapes is formed on a surface of the tooth unit.

5. The toothed drum type oil recovery device according to claim 1,
    wherein the tooth unit is formed so that a front inclination angle of a front tooth surface thereof and a rear inclination angle of a rear tooth surface thereof are different from each other.

6. The toothed drum type oil recovery device according to claim 1,
    wherein the tooth unit is formed to have a height of 1 mm to 6 mm and a width of 1 mm to 6 mm.

* * * * *